United States Patent Office 3,565,638
Patented Feb. 23, 1971

3,565,638
FROZEN EGG MIXTURE
Homer F. Ziegler, Jr., Kirkwood, Robert D. Seeley, Crestwood, and Robert L. Holland, Ballwin, Mo., assignors to Anheuser-Busch, Incorporated, St. Louis, Mo., a corporation of Missouri
No Drawing. Filed May 22, 1968, Ser. No. 731,289
Int. Cl. A23l 1/32
U.S. Cl. 99—113
9 Claims

ABSTRACT OF THE DISCLOSURE

A frozen egg product which can be used to make scrambled eggs, omelets, etc., and which has improved stability against color change and syneresis after cooking. The product comprises fresh eggs, milk solids, water, starch, vegetable gum, and an edible acid, preferably citric acid. The product is made by lowering the pH to below about 7.1 prior to homogenization, pasteurization and freezing.

BACKGROUND OF THE INVENTION

This invention relates to a new and improved egg product, and to a process for making the same. This invention relates further to a method of improving the stability of the egg product after cooking. For the preparation of scrambled eggs, omelets and other dishes, whole eggs are cracked and then beaten to intimately mix the egg whites and the egg yolks. In the baking industry it has been found that if eggs are cracked, homogenized, pasteurized and frozen, the eggs can be shipped and stored in the frozen condition and thawed at the time of usage. In the manufacture of baked goods these homogenized frozen eggs are of excellent quality, and have flavor and functional qualities equivalent to freshly shelled whole eggs.

The use of these homogenized frozen whole eggs for the preparation of scrambled eggs and egg omelets, produces products of good quality if the egg product is consumed immediately. In institutions and restaurants, where the scrambled eggs or egg omelets are prepared some time before being consumed, the homogenized frozen eggs, when used after thawing, do not produce scrambled eggs or omelets of good quality.

The primary problems which are noted are (1) the eggs after cooking will turn green on standing on a hot plate, (2) the scrambled eggs prepared from thawed frozen whole eggs will "weep" on standing due to syneresis, and (3) the homogenized whole eggs become tougher and more rubbery in eating qualities on standing.

It is believed that the production of the greenish color in scrambled eggs on standing is due to the development of a reaction product with iron. This reaction can be prevented by complexing the iron in such a manner that the iron sulfide which produces the green color is not formed. Disodium or calcium disodium ethylenediaminetetraacetate (Salts of EDTA) are compounds which complex metallic iron and prevent the greenish color from developing. Acidification of egg compositions with an edible acid or acid salt to a pH below 7.1 prevents discoloration of the eggs possibly by inhibiting the formation of sulfide ions.

There are objections to the use of either of the foregoing methods. For example, if citric acid is used to lower the pH, the degree of syneresis increases, and affects the eating quality of the scrambled eggs or omelets.

SUMMARY OF THE INVENTION

The present invention comprises a frozen egg mix which does not turn color after thawing and cooking, which is of good eating and processing qualities, and is free from syneresis. This invention comprises a frozen acidified egg product which includes milk solids, vegetable flour, water and a vegetable gum.

DETAILED DESCRIPTION

Color development in cooked eggs is prevented by acidifying the eggs to about pH 6.8 to 7.1, preferably with citric acid. Milk solids, in the form of whole milk or reconstituted milk solids, add lightness, good eating quality and lessen syneresis. An edible starch, preferably potato flour or wheat starch, also helps to decrease syneresis. A vegetable gum is used to increase the viscosity of the egg mixture after commercial processing, making it more suitable to use during the cooking process.

The process of this invention includes the steps of cracking whole eggs, mixing or homogenizing the eggs, adding water, non-fat milk solids, potato flour, and a vegetable gum, blending, homogenizing, pasteurizing and freezing. Using this process, this invention provides an egg composition composed of acidified whole eggs, water, milk solids, potato flour, and a vegetable gum, which, after freezing and thawing, can be used to produce scrambled eggs and omelets of a quality equal to or superior to fresh shell eggs.

Of the vegetable gums, carboxymethyl cellulose (CMC) and an alginate can be used. Carboxymethyl cellulose is the preferred vegetable gum, as it produces a product more stable after pasteurization and can be dry-blended with the other solid ingredients before mixing with the whole eggs.

In restaurants and in institutions it has long been the common practice in the preparation of scrambled eggs to add a "white sauce" as an extender, and to improve the lightness and steam table stability of the egg products. These sauces are composed usually of milk, wheat flour, and butter or margarine. Egg mixes containing these sauces do improve the palatability but do not prevent the discoloration from the iron salts on standing, and do not eliminate syneresis. One such white sauce is given below:

| | Percent |
|---|---|
| Liquid whole milk | 89 |
| Bread flour | 5.5 |
| Margarine | 5.5 |

The white sauce is combined with the fresh shell eggs in a ratio of 2 to 5 parts of eggs to white sauce.

Whole eggs after cooking, whether a white sauce is added or not, all become discolored on standing on a steam table. Lowering the pH of the egg product prevents this greenish color from developing. Example 1 shows the effect of pH upon cooked egg color on standing.

EXAMPLE 1

A one gallon carton of frozen whole eggs containing 26% solids is thawed and divided into 5 portions. One portion is held as a control—Sample I. In Sample II, enough citric acid is added to lower the pH from 7.4 to 6.35. To Sample III is added 0.5% monosodium phosphate dissolved in 0.5% water. To the whole eggs in Sample IV 550 p.p.m. of disodium EDTA is added. To Sample V is added enough citric acid to lower the pH to 6.35, and 500 p.p.m. of disodium phosphate.

200 gram portions of each sample are soft-scrambled in a skillet. 100 gram portions are put in custard cups and covered with aluminum foil and heated in an oven at 350° F. in a double-pan. After 60 min. the color of the various egg samples is evaluated. Results are shown in Table I.

TABLE I

| Sample | pH | Color of cooked eggs after 60 minutes |
|---|---|---|
| I Whole eggs | 7.4 | Green. |
| II Whole eggs plus citric acid | 6.35 | No marked change. |
| III Whole eggs plus 0.5% monosodium phosphate. | 6.5 | Do. |
| IV Whole eggs plus 500 p.p.m. disodium EDTA. | 7.3 | Tannish brown. |
| V Whole eggs plus citric acid plus 500 r.p.m. disodium EDTA. | 6.35 | No marked change. |

The control whole eggs which had a pH of 7.4 were green, whereas the eggs containing citric acid (Sample II) had no marked change in color. The addition of 0.5% of monosodium phosphate, which lowered the pH of the whole eggs to 6.5, also prevented any marked color change. The addition of disodium EDTA to whole eggs at a pH of 7.3 gave a tannish color after 60 min., whereas where the EDTA was added to the citric acid eggs there was no marked change. Lowering the pH to below about 7.1 prevents the development of the greenish color.

The addition of a typical white sauce containing water, milk solids and wheat flour to 2 parts of whole eggs gives a good steam table appearance after cooking, but has a poor appearance and shows excessive syneresis as the pH of the mixture is lowered to prevent green discoloration as shown in the following Example 2.

EXAMPLE 2

A white sauce is made by blending 10.7 parts non-fat milk solids, 5.5 parts bread flour and 5.5 parts margarine with 78.3 parts water.

400 grams of whole eggs are mixed with 200 grams of white sauce and scrambled in a Groen steam jacketed kettle for 6 minutes. 18 grams of margarine are melted in the kettle before putting in the egg mix. After scrambling the eggs, the eggs are placed in a pan on a steam table for 2 hours.

To one 600 gram batch of eggs and sauce enough citric acid is added to lower the pH from 7.1 to 6.2. Results of this test are shown in Table II.

TABLE II

| | pH | Appearance after scrambling | Flavor-texture[1] |
|---|---|---|---|
| Whole eggs plus white sauce | 7.1 | Normal | Good texture. |
| Whole eggs plus white sauce plus citric acid. | 6.2 | Curdled[2] | Tough. |

[1] After 2 hours on steam table, temperature 145–152° F.
[2] Excessive weepage.

The initial appearance of a scrambled egg mix before scrambling when the white sauce made with wheat flour is used has a thin consistency which is undesirable when the egg product is scrambled on a flat griddle. Normally, freshly scrambled eggs have a viscosity which limits their flow on the griddle. Further wheat flour does not prevent excessive syneresis. It has been found that the addition of potato flour will increase the consistency of the uncooked scrambled egg mix, and prevent syneresis. To show this, several 2 to 1 mixtures of whole eggs to white sauce are prepared as in Example 2, except that the wheat flour in the white sauce is replaced with potato flour. The uncooked mix has a thicker consistency than the egg mixture made with bread flour. The pH's of the batches are adjusted with citric acid to various levels and eggs scrambled and placed on a steam table. The effect of the various pH's in steam table stability are shown in Table III.

TABLE III.—WHITE SAUCE WITH POTATO FLOUR ADDED TO EGG MIX

| | pH | Appearance after 2 hours on steam table |
|---|---|---|
| Sample: | | |
| 1 | 7.1 | Slight greening —slight firming. |
| 2 | 6.8 | No greening, medium-wet, good flavor and consistency. |
| 3 | 6.6 | Darker yellow, wet, slightly mealy. |
| 4 | 6.4 | Darker yellow, wet, very mealy. |

The pH of egg mixtures containing a white sauce with 2 parts of eggs to 1 part sauce is 7.1. At this pH a slight greening discoloration occurs when the cooked eggs are held on the steam table. As the pH decreases below 7.1, the development of greenish color disappears. The flavor and consistency improves down to a pH of 6.8, below which mealiness develops. The best scrambled eggs are produced from the egg mix with the pH adjusted to 6.8 with citric acid.

Similar results are obtained using an egg mix containing 77.50% whole eggs, 19.35% water, 1.36% potato flour, 1.39% NFMS and 0.31% salt. The batches are adjusted with 50% citric acid to various pH's, and cooked for 8½ minutes in a Groen kettle. The results in Table IV demonstrate that below pH 7.2, green discoloration does not occur on the steam table.

TABLE IV

| | Syneresis percent | Consistency | Color |
|---|---|---|---|
| pH of egg mix: | | | |
| 7.2 | 3.5 | Slightly tough | Greening after 2 hours. |
| 7.0 | | Tender | No greening. |
| 6.8 | 4.5 | do | Do. |
| 6.4 | 6.8 | do | Do. |

The percent of syneresis ("weepage") is determined as follows: (1) preheat a Groen steam-jacketed kettle to 190° F., (2) melt 3.0% margarine or butter in kettle, (3% of egg weight), (3) pour 500 gms. of thawed egg product (68° F.) into kettle and allow to cook for 2 minutes before scraping (with large metal spoon), (4) continue scraping thoroughly each minute thereafter until a cooking time of 8½ minutes has been attained, (5) weigh cooked eggs from kettle and place in 32 oz. fluted funnel, (6) place funnel in oven at 140° F. and collect filtrate in graduate, and (7) calculate syneresis at 1 hour.

$$\frac{\text{Ml. filtrate} \times 100}{\text{Wt. of Cooked Eggs}} = \text{Percent syneresis}$$

The addition of milk solids in the form of whole milk or reconstituted milk solids imparts fluffiness and improved eating properties to scrambled eggs. If the level of milk solids is too high, mealiness develops. In Table V are shown the results of egg mixes containing increasing levels of non-fat milk solids (NFMS) and the results of cooking these products. The optimal level is less than 4.0% NFMS. At 4% NFMS in the egg mix the undesirable mealy texture develops. The preferred level is between 2 to 3% NFMS. An egg mix containing 2–3% NFMS will contain 16.7% to 25.0% reconstituted NFMS. Therefore, the percent of whole eggs in the egg mix is approximately 75% or more. The milk solids can be in the form of whole milk, skimmed milk, or reconstituted dry solids.

TABLE V

| Whole eggs Percent: | Reconstituted NFMS,[1] percent | NFMS, percent | After cooking | |
|---|---|---|---|---|
| | | | Syneresis, percent | Eating quality and consistency |
| 100 | 0 | 0 | 0.5 | Eggy flavor—tough. |
| 91.7 | 8.3 | 1.0 | 0.9 | Mild flavor—tender. |
| 83.3 | 16.7 | 2.0 | 3.2 | Do. |
| 75.0 | 25.0 | 3.0 | 6.5 | Mild flavor—slight tender. |
| 66.7 | 33.3 | 4.0 | 10.5 | Mild flavor—mealy. |
| 58.4 | 41.6 | 5.0 | 18.2 | Slight tough—slight mealy. |

[1] 12% NFMS in water.

At a level of 25% reconstituted NFMS (1.92% solids) to 77% eggs, the egg mix produces a tender scrambled egg but the degree of syneresis is significant. The addition of low levels of potato flour minimizes syneresis without affecting tenderness. Using a formula of 77% whole eggs and 23% reconstituted NFMS, and adjusting the pH to 6.8, various levels of potato flour are added to the mixes. After steam kettle cooking for 8½ minutes, syneresis is measured and the data is shown in Table VI. The cooked control egg mix has a syneresis value of 6.7%. The range of syneresis should be between 0 and about 6%, preferably as low as possible.

TABLE VI.—BASIC EGG MIX
Whole eggs, 77%
NFMS, 2.76%
Water, 20.24%
Potato flour additions in percent of basic egg mix

| Potato flour added, percent | Syneresis, percent | Eating consistency |
|---|---|---|
| 0 | 6.7 | Tender |
| 0.5 | 4.6 | Do. |
| 1.0 | 3.9 | Very tender. |
| 2.0 | 2.1 | Do. |
| 3.0 | 0.7 | Slightly mealy. |
| 4.0 | 0.9 | Very mealy.[1] |
| 5.0 | 0.5 | Very mushy and mealy.[1] |

[1] Noticeable discoloration of mix before cooking with 4-5% potato flour, mix was very viscous.

Significant reduction in syneresis occurred when the egg mix contained more than 0.5% potato flour in the egg mix. Above 3.0% potato flour, an undesirable mealy texture develops. Although a range of approximately 0.5% to 3.0% edible starch can be used, the preferred level is 2%, and the preferred starch is potato flour, wheat starch, or mixtures of these two.

Other sources of vegetable starches in the form of starches or flours can be used. Egg mixes were made using 2% vegetable flour or starch with 77% whole eggs, 18.9% water, 1.4% NFMS and citric acid to have the pH to 6.8. The results of these tests are shown in Table VII.

TABLE VII

| Flour or starch | Viscosity, cps. | Percent syneresis | Eating consistency |
|---|---|---|---|
| Potato flour | 1,950 | 2.6 | Very tender. |
| Wheat starch | 2,050 | 3.4 | Do. |
| Tapioca starch | 2,100 | 5.5 | Tough. |
| Corn starch | 3,050 | 7.6 | Tough—off flavor. |
| Rice flour | 850 | 1.4 | Tender. |
| Soy flour | 750 | 2.9 | Do. |
| Cottonseed flour | 1,200 | 3.4 | Tender—off flavor. |

Potato flour and wheat starch had the most acceptable viscosity properties and eating consistency.

Similar to the results observed with an egg mix containing only whole eggs and reconstituted NFMS, the optimal level of whole eggs to be used in the egg mix containing NFMS and potato flour should be above 70%. Using a mixture of non-fat milk solids and potato flour containing 19.3 parts of water, 1.50 parts potato flour, and 1.40 parts non-fat milk solids, a quantity of the mix was added to whole eggs in the ratios shown in Table VIII. When the percent of whole eggs is reduced to below 70% the consistency and taste of the scrambled eggs is slightly mealy, and at 55% whole eggs the cooked eggs are significantly mealy. Weepage increases as the percent of whole eggs decreases. A preferred level is approximately 77% whole eggs.

With an optimal level of approximately 77% whole eggs, 19% water, 2% potato flour and 1.4% non-fat milk solids, the egg mix prepared under fresh conditions has a viscosity somewhat less than that of whole scrambled eggs alone. This difference in viscosity is noticeable especially when scrambled eggs or omelets are made on a griddle where the spreading tendency of the less viscous egg mix is undesirable. This decrease in viscosity increases during the commercial production of the egg mix in an egg processing plant where the product must be pasteurized. Apparently a partial gelatinization of the potato flour occurs resulting in a thicker product between the pasteurizer and homogenizer, but during homogenization there is a partial retrogradation of the potato starch, resulting in decreased final viscosity. It also appears that the water-binding capacity of the starch fraction is affected, causing slightly greater syneresis.

It has been found that the addition of a small amount of either sodium alginate or carboxymethyl cellulose will increase the viscosity of the egg mix, which occurs after pastuerization and homogenization.

TABLE VIII

| Whole eggs, percent | Water-NFMS-flour mix, percent | Syneresis, percent | Consistency |
|---|---|---|---|
| 65 | 35 | 7.9 | Mealy. |
| 70 | 30 | 6.4 | Sl. mealy. |
| 75 | 25 | 5.4 | Good—tender. |
| 77.7 | 22.3 | 4.4 | Do. |

An egg mix was prepared consisting of 386.5 parts of thawed whole eggs, 96 parts of water, 7.0 parts of non-fat milk solids, and approximately 0.5 ml. of a 25% solution of citric acid to bring the pH to 6.9. To individual batches of this egg mix were added varying levels of CMC and sodium alginate. The effect on viscosity is shown in Table IX. The viscosities were measured with a Brookfield viscosimeter (Model HBF). The viscosity measurements are reported in centipoises (cps.).

TABLE IX

| Additive, percent | Viscosity, 68° F. cps. |
|---|---|
| Batch number: | |
| 1 —— CMC 0.10 | 175 |
| 2 —— CMC 0.25 | 560 |
| 3 —— CMC 0.50 | 3,700 |
| 4 —— Sodium alginate 0.25 | 330 |
| 5 —— Sodium alginate 0.50 | 1,500 |
| 6 —— Potato flour 2.0 | 175 |

The viscosity range of the product is above 500 cps. at 68° F. Preferably the viscosity of the thawed product is between about 850 and 1250 cps. or higher.

Batch No. 6 is the egg mix to which 2% potato flour is added. This egg mixture has a viscosity of 175 cps. and a syneresis of 4.7%. The addition of 0.10% CMC in place of the potato flour has about the same viscosity and syneresis. As the level of CMC is increased, the viscosity increases to 3700 cps. at 0.5% level. The sodium alginate at the 0.5% level is somewhat less effective than CMC in increasing the viscosity. This is also true at the 0.5% level. These data demonstrate that additions of small amounts of either CMC or sodium alginate will increase the viscosity of the mix. When a whole egg mix containing 77% whole eggs, 19.2% water, 2.0% potato flour, and 1.4% non-fat milk solids is made up and either 0.25% CMC or sodium alginate is added, the viscosity increases from 110 cps. for the control batch containing neither of the additives, to a viscosity of 850 cps. for the sodium alginate and 1280 cps. for CMC.

In another test using the same formula and adding 0.15 or 0.25% sodium alginate, the percent syneresis is 2.9% and 2.2%, respectively. A control egg mix to which no sodium alginate is added has syneresis of 8.8%. After scrambling, the egg mix which contains the sodium alginate is very tender and of good consistency. The control egg mix without sodium alginate is not as tender.

The optimal level of CMC to be used is limited by the effect of the gum on texture. As shown in Table X, the viscosity increases as the level of CMC is increased but at approximately 0.25%, the cooked egg mix has a slightly sticky and mealy texture. The preferred level is approximately 0.10% based on the basic egg mix.

TABLE X

Basic Formula:
Whole eggs, 77.1
Water, 19.45
Potato flour, 2.0
NFMS, 1.4
Citric acid, 0.05
CMC additions in percent of basic egg mix.

| Level of CMC, percent | Viscosity cps. | After cooking | |
|---|---|---|---|
| | | Syneresis, percent | Eating consistency |
| 0 | 1,125 | 2.45 | Very tender. |
| 0.05 | 1,550 | 1.52 | Do. |
| 0.10 | 1,850 | 1.44 | Do. |
| 0.25 | 1,975 | 0.49 | Slightly sticky and mealy. |
| 0.50 | 4,250 | 0.25 | Do. |

The range of vegetable gum is from about 0.025% to about 0.5%.

Other vegetable gums were tested in egg mixes at the 0.1% level. The basic formula was 77.1% whole eggs, 19.2% water, 2.0% potato flour, 1.4% NFMS, 0.1% vegetable gums, 0.15% water with 0.05% citric acid. The results in Table XI demonstrate that many vegetable gums will give the desired viscosity, prevent syneresis and have acceptable eating qualities. These vegetable gums include CMC, alginates, methylcellulose, Karaya, guar, locust bean and agar.

TABLE XI

| Gum additives | Viscosity, cps. | Syneresis, percent | Eating consistency |
|---|---|---|---|
| CMC | 1,800 | 1.6 | Very tender. |
| Dariloid, Algin | 1,825 | 2.1 | Do. |
| Kelcosol, sodium alginate | 2,300 | 1.8 | Do. |
| Methylcellulose | 2,700 | 3.1 | Tender, slightly gummy. |
| Karaya, exudate gum | 1,400 | 2.7 | Very tender. |
| Guar | 2,775 | 1.2 | Very tender, slightly sticky. |
| Locust bean | 1,725 | 1.4 | Tender, slightly mealy. |
| Agaragar | 1,200 | 2.4 | Slightly tough. |

The green color formation after cooking the preferred egg mix containing milk solids, a source of edible starch and a vegetable gum, can be prevented by lowering the pH to about 7.1 or below by a variety of edible organic or inorganic acids or their acid salts. In Example 3 is demonstrated the use of lactic, acetic, hydrochloric and phosphoric acids.

EXAMPLE 3

A mixture of 1542 gms. of whole eggs, 384 gms. of water, 40 gms. of potato flour, 28 gms. of N.F.M.S. and 2 gms. of CMC were blended in a Hobart mixer. The mix was divided into batches and the pH lowered to 6.8 with either lactic, acetic, hydrochloric or phosphoric acid. A control batch was kept at the natural pH of the whole egg. After cooking and holding the cooked eggs for 2 hours at 170–190° F., a greenish discoloration was only observed in the control batch.

| Batch | pH | Color |
|---|---|---|
| Control | 7.4 | Greenish discoloration. |
| Lactic acid | 6.8 | No greenish discoloration. |
| Acetic acid | 6.8 | Do. |
| Hydrochloric acid | 6.8 | Do. |
| Phosphoric acid | 6.8 | Do. |

The following examples describe the preparation of the egg mixes at a production level.

EXAMPLE 4

345 lbs. of water is pre-weighed and placed in a Lomax mixer with a Lightnin mixer attached for top mixing and blending. 36 lbs. of potato starch, and 25 lbs. of non-fat milk solids are added. The mixture of potato starch and non-fat milk solids in water is removed from the Lomax mixer into a holding tank.

348 lbs. of fresh whole eggs are placed in the Lomax mixer to which is added 101.7 lbs. of the water, potato flour and non-fat milk solids mixture. The pH of each batch is individually adjusted with citric acid to a pH from 6.85 to 7.0. Four such batches are prepared and combined in a holding tank, pasteurized, homogenized, and the mixture cooled and pumped to another holding tank prior to packing. The egg mix is packed into 1-gallon cartons and frozen immediately. The temperature of the non-fat milk solids, potato flour, water mixture is 96° F. The temperature of the egg and sauce blend is 78° F., pasteurization is at 145° F., and the pressure of homogenization is 600 and 1500 p.s.i.

On thawing, the egg mix had the following properties:

Odor—very bland
pH—7.01

After cooking:
Color—very good—yellow
Syneresis—6.9%
Eating quality—tender

EXAMPLE 5

450 lb. batches of the egg mix are made with the following formula:

| | Lbs. |
|---|---|
| Fresh shell eggs | 347.4 |
| Water | 86.4 |
| Potato flour | 9 |
| Non-fat milk solids | 6.3 |
| CMC | 0.45 |
| Citric acid | 0.45 |

Batch No. 1.—All of the water and eggs are scaled into a Lomax churn equipped with two bottom agitators and one side mixer. The potato flour and the non-fat milk solids are combined in the dry state and slowly added to the egg mixture with all three mixers running and allowed to mix until smooth. The carboxymethylcellulose (CMC) is suspended in a 1 to 3 ratio in propylene glycol and added to the egg, flour and non-fat milk solids blend. The pH is adjusted to 6.84 by the addition of the citric acid solution.

Batch No. 2.—100% of the water and 25% of the eggs are added to the churn. The potato flour and non-fat milk solids and CMC are dry blended and added to this mixture, and mixed until smooth. The remaining egg is added and blended until uniform. The batches are pasteurized at 145 to 146° F. and homogenized at 2100 p.s.i. Product temperature to the pasteurizer is 66° F. After cooling, the egg mixture is packed in cartons and immediately frozen.

The excellent quality of this egg mix containing whole eggs, water, non-fat milk solids, potato flour, and a vegetable gum is shown from the following data. After one month, a gallon carton of the egg mix as prepared in Example 5 was thawed. The viscosity was 775 cps. After cooking, the 1 hr. syneresis was 4.6% and the eating quality judged very tender.

Some of the thawed egg mix prepared in Example 5 was refrozen and subjected to a second thaw, and again used to prepare scrambled eggs. In Table XII are the results of these tests.

TABLE XII

| Eating quality | Viscosity | Syneresis |
|---|---|---|
| After 1st thaw, tender—very good | 625 | 3.6 |
| After 2nd thaw, tender—very good | 763 | 4.6 |

The eggs in both cases have excellent eating qualities, good viscosity, and a low degree of syneresis. This is particularly striking as even after the eggs were thawed and refrozen and thawed a second time, the quality was not impaired.

The egg mixes can be modified in obvious ways by the addition of cheese, mushrooms, peppers and other ingredients normally added to eggs for the preparation of omelets and other egg dishes. Such modifications of the basic formulation in this invention are known to those skilled in the art.

This invention is intended to cover all changes and modifications of the examples of the invention herein chosen for purposes of the disclosure which do not constitute departures from the spirit and scope of the invention.

What is claimed is:

1. A process for preparing a frozen egg mixture consisting of the steps of (1) cracking fresh shell eggs, (2) mixing the whole eggs with an aqueous dispersion of milk solids, an edible starch, and a vegetable gum, (3) lowering the pH of the mix below about 7.1, (4) homogenizing and pasteurizing the egg mix, and packing and freezing the pasteurized mix, the percentage of whole egg in the final egg mixture being not less than about 70%, the percentage of milk solids being about 1% to about 4%, the percentage of edible starch being from about 0.5% to about 3.0%, and the percentage of vegetable gum being from about 0.025% to about 0.5%, the pH of the final egg mixture being between about 6.8 and about 7.1.

2. A process described in claim 1 wherein the pH of the egg mix is lowered below a pH of about 7.1 with citric acid.

3. A process described in claim 1 wherein the vegetable gum is carboxylmethylcellulose.

4. A process described in claim 1 wherein the starch is selected from the group consisting of potato flour, wheat starch, and mixtures thereof.

5. The process of claim 1 wherein the percentage of shelled eggs is between about 75% and about 80%, there is about 2% to about 3% non-fat milk solids, from about 15% to about 22% water, about 1% to about 2% potato flour, and from about 0.1% to about 0.25% of vegetable gum, citric acid is used to lower the pH.

6. The process of claim 5 wherein the vegetable gum is carboxymethylcellulose.

7. A homogenized frozen egg mix comprising about 70%–80% whole eggs, about 15%–22% water, about 1%–2% starch, about 0.1% to 0.25% vegetable gum, and sufficient acidic material to give a pH between about 7.1 and about 6.8, said product having a viscosity of more than about 500 cps., a syneresis of less than about 6%, and not discoloring after cooking.

8. The composition of claim 7 wherein the starch is potato flour, the vegetable gum is carboxymethylcellulose, and the acidic material is citric acid.

9. The composition of claim 7 wherein the starch is selected from the group consisting of potato, wheat, and mixtures thereof.

References Cited

UNITED STATES PATENTS

| 3,465,180 | 10/1969 | Jones | 99—113 |
| 3,383,221 | 4/1968 | Chin et al. | 99—113X |
| 3,222,194 | 12/1965 | Gorman et al. | 99—210 |
| 2,848,334 | 8/1958 | Jones | 99—113 |

JOSEPH M. GOLIAN, Primary Examiner

U.S. Cl. X.R.

99—161, 196

UNITED STATES PATENT OFFICE
CERTIFICATE OF CORRECTION

Patent No. 3,565,638                    Dated February 23, 1971

Inventor(s) Homer F. Ziegler, Jr., et al.

It is certified that error appears in the above-identified patent and that said Letters Patent are hereby corrected as shown below:

Column 3, Table I, Sample V, "r.p.m." should read -- p --. Column 6, line 38, "pastuerization" should read -- pasteurization --. Column 8, line 65, "6.84" should read -- 6.85 --. Column 10, line 36, "3,465,180" should read -- 3,475,180 --.

Signed and sealed this 17th day of August 1971.

(SEAL)
Attest:

EDWARD M. FLETCHER, JR.                WILLIAM E. SCHUYLER, JR.
Attesting Officer                       Commissioner of Patents